(12) United States Patent
Huettner et al.

(10) Patent No.: US 6,707,417 B2
(45) Date of Patent: Mar. 16, 2004

(54) ACCURATE RANGE CALIBRATION ARCHITECTURE

(75) Inventors: Steven Edward Huettner, Tucson, AZ (US); Steven Craig Rein, Oro Valley, AZ (US); Douglas Richard Baker, Tucson, AZ (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/166,948

(22) Filed: Jun. 11, 2002

(65) Prior Publication Data

US 2004/0001020 A1 Jan. 1, 2004

(51) Int. Cl.$^7$ .............................. G01S 7/40; G01S 13/00
(52) U.S. Cl. ...................... 342/174; 342/68; 342/82; 342/89; 342/165; 342/173; 342/175; 102/206; 102/211; 102/214
(58) Field of Search ................. 342/13–20, 82, 342/89, 165, 166–175, 195, 61, 62, 63, 64, 65, 103, 27, 28, 66, 67, 68; 244/3.1, 3.15, 3.19; 102/200, 206, 211–214

(56) References Cited

U.S. PATENT DOCUMENTS

| | | | | |
|---|---|---|---|---|
| 3,885,238 A | * | 5/1975 | Klein et al. ................. | 342/103 |
| 4,968,968 A | * | 11/1990 | Taylor ........................ | 342/174 |
| 5,160,933 A | * | 11/1992 | Hager ......................... | 342/174 |
| 5,241,316 A | * | 8/1993 | Pringle ....................... | 342/62 |
| 5,315,304 A | * | 5/1994 | Ghaleb et al. ............... | 342/165 |
| 5,412,414 A | * | 5/1995 | Ast et al. .................... | 342/174 |
| 5,467,092 A | * | 11/1995 | Roos et al. .................. | 342/174 |
| 5,793,327 A | | 8/1998 | Carnes et al. ................ | 342/135 |
| 5,808,578 A | * | 9/1998 | Barbella et al. ............. | 342/62 |
| 5,943,003 A | | 8/1999 | Shollenberger .............. | 342/94 |

FOREIGN PATENT DOCUMENTS

| | | | | |
|---|---|---|---|---|
| EP | 0427206 A2 | * | 5/1991 | ........... G01S/13/28 |
| EP | 0473082 A2 | * | 3/1992 | ........... G01S/13/18 |
| EP | 0727676 B1 | * | 8/1996 | ............. G01S/7/40 |

OTHER PUBLICATIONS

Catalog entitled "Microwave Products, Ferrite Waveguide Components & Subsystems," 24 pages, EMS Technologies, Space & Technology Group, no date given.

* cited by examiner

Primary Examiner—Bernarr E. Gregory
(74) Attorney, Agent, or Firm—Larry K. Roberts; Thomas J. Finn; Glenn H. Lenzen, Jr.

(57) ABSTRACT

A radar system having a tactical mode and a calibration mode includes a transmitter section for providing high-power amplification of an RF pulsed waveform from an exciter during the tactical mode and the calibration mode. A circulator system has an input port connected to an output of the transmitter section and including first, second and third switchable junctions, and a high-power attenuator. The circulator system provides a transmit tactical mode signal path and a transmit calibration mode signal path of virtually identical electrical path lengths for a transmitter output signal, the tactical path passing through the first, second and third junctions in a first direction to an antenna I/O port, the calibration path passing through the first, second and third junctions in a second direction and through the high-power attenuator to an output port. A receiver section is coupled to the output port and includes a receive tactical mode signal path through a low noise amplifier (LNA), mixer, and an intermediate frequency (IF) amplifier to an IF output port for down-converting a radar signal. The receiver section further includes a receive calibration mode signal path through an attenuator which bypasses the LNA and passes through the mixer and IF amplifier to the IF output port.

15 Claims, 2 Drawing Sheets

ACCURATE RANGE CALIBRATION ARCHITECTURE

This invention was made with Government support under Department of the Navy Contract No. N000024-97-C-5390 CLIN 0001AA TI 416, awarded by the Department of the Navy.

BACKGROUND OF THE DISCLOSURE

Anti-ballistic missile guidance systems require extremely accurate warhead fuzing. A radar fuze system on a missile uses very short pulse width and extremely fast rise/fall time RF pulses to determine the range and range-rate of the target. A receive/transmit (RX/TX) system is employed to process the RF radar pulse and its target return. In a tactical mode, radar pulses are amplified by a high-power transmitter, then broadcast at the target. The target returns the pulse, which enters the transmitter/receiver through the antenna, and is amplified and down-converted by the receiver.

For range calibration, the system should provide an alternate signal path from the transmitter to the receiver, which bypasses the antenna, to enable the system to measure its own time delay. In a calibration mode, the alternate signal path should maintain three characteristics. First, it should attenuate the radar pulse signal power dramatically to within a small amplitude window to simulate the small radar return of a target with an acceptable IF output power, while keeping the receiver well below its saturation level but above the system noise floor. Second, it should preserve the integrity of important radar pulse characteristics, including rise/fall times and pulse width. Third, it should provide a group delay nearly identical to the group delay of a transmitted/received pulse reflected from a theoretical target at a fixed close range. The tolerance versus operating frequency, temperature, exciter power, and from unit-to-unit on the group delay difference between the calibration mode signal path and the tactical mode signal path sets the accuracy to which a target's range can be determined.

A switchable two-junction circulator has been used to establish a calibration mode path. The first junction was used to attenuate the transmitter output power during the calibration mode, while the second junction bypassed the antenna during calibration and routed the radar pulse directly to the receiver. This approach allowed the transmit amplifier chain to operate at full output power during calibration, thereby preserving the important pulse characteristic of rise/fall time and pulse width. However, the poor frequency response of the first circulator junction in the calibration mode had an undesirable effect on pulse rise/fall time, since the dominant signal path through this junction in the calibration mode is in the reverse direction of normal signal flow. This reverse-direction signal path has a frequency response similar to that of a notch filter, containing large variations in signal amplitude and group delay over the range of frequencies represented by the pulsed RF signal. This lack of amplitude and delay flatness in the frequency domain translates to poor signal fidelity (e.g. changes in pulse rise/fall time, overshoot, and ringing) in the time domain. A pair of SPST switches within the receiver chain further reduced the calibration mode signal amplitude within the receiver, but had an unpredictable group delay variation due to leakage path effects, resulting from the dominant signal path in the receiver in the calibration mode including the leakage through these SPST switches in their OFF positions. These switches have no requirements for amplitude or delay flatness with respect to frequency in their OFF positions. Typically, in the OFF position, these switches exhibit large variations in amplitude and group delay with respect to frequency. Similar to the reversed circulator junctions, the amplitude and delay variations that these switches exhibit in the frequency domain translate to poor signal fidelity in the time domain.

A prior approach by applicants incorporated a bypass path on the transmitter, instead of switching the first junction of the two-junction circulator to attenuate the transmit pulse amplitude. This scheme provides improved group delay accuracy, but does not accurately preserve pulse rise/fall times and pulse width because the transmit chain's non-linear elements are operating at two radically different conditions in the tactical and calibration modes. The accuracy of this approach was found to be highly dependent on temperature and input power. The addition of a controlled attenuation bypass path in the receiver improved the group delay and frequency response characteristics of the RX/TX.

SUMMARY OF THE DISCLOSURE

An exemplary embodiment of a system in accordance with the invention is a radar system having a tactical mode and a calibration mode. A transmitter section provides high-power amplification of an RF pulsed waveform from an exciter during the tactical mode and the calibration mode. A three-junction circulator system has an input port connected to an output of the transmitter section, and includes a high-power attenuator. The circulator system provides a transmit tactical mode signal path and a transmit calibration mode signal path of virtually identical electrical path lengths for a transmitter output signal. The tactical path passes through the first, second, and third junctions in a first direction to an antenna I/O port. The calibration path passes through the first, second, and third junctions in a second direction and through the high-power attenuator to an output port. A receiver section is coupled to the output port, and includes a receive tactical mode signal path through a low noise amplifier (LNA), mixer, and intermediate frequency (IF) amplifier to an IF output port for down-converting a radar signal. The receiver section further includes a receive calibration signal path through an attenuator which bypasses the LNA and passes through the mixer and IF amplifier to the IF output port.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE DISCLOSURE

A purpose of an exemplary embodiment of the invention is to provide an accurate range calibration technique for pulsed Doppler radar systems. In a radar ranging system, distance is measured by converting the time it takes for a transmitted RF signal to reflect from a target and return to the radar's receiver. Thus, accuracy in time measurement is converted to accuracy in distance measurement. For a radar system, the time accuracy will be determined through a calibration measurement. For example, with the speed of light being 3×10$^{10}$ centimeters/second, a radar that is able to resolve a target return to 100 pico-seconds will provide a range accuracy of 1.5 centimeters. This is a goal of an exemplary embodiment of the invention, which is illustrated in FIGS. 1 and 2, although other applications embodying the invention may have lesser or greater range accuracy.

Figure 1:
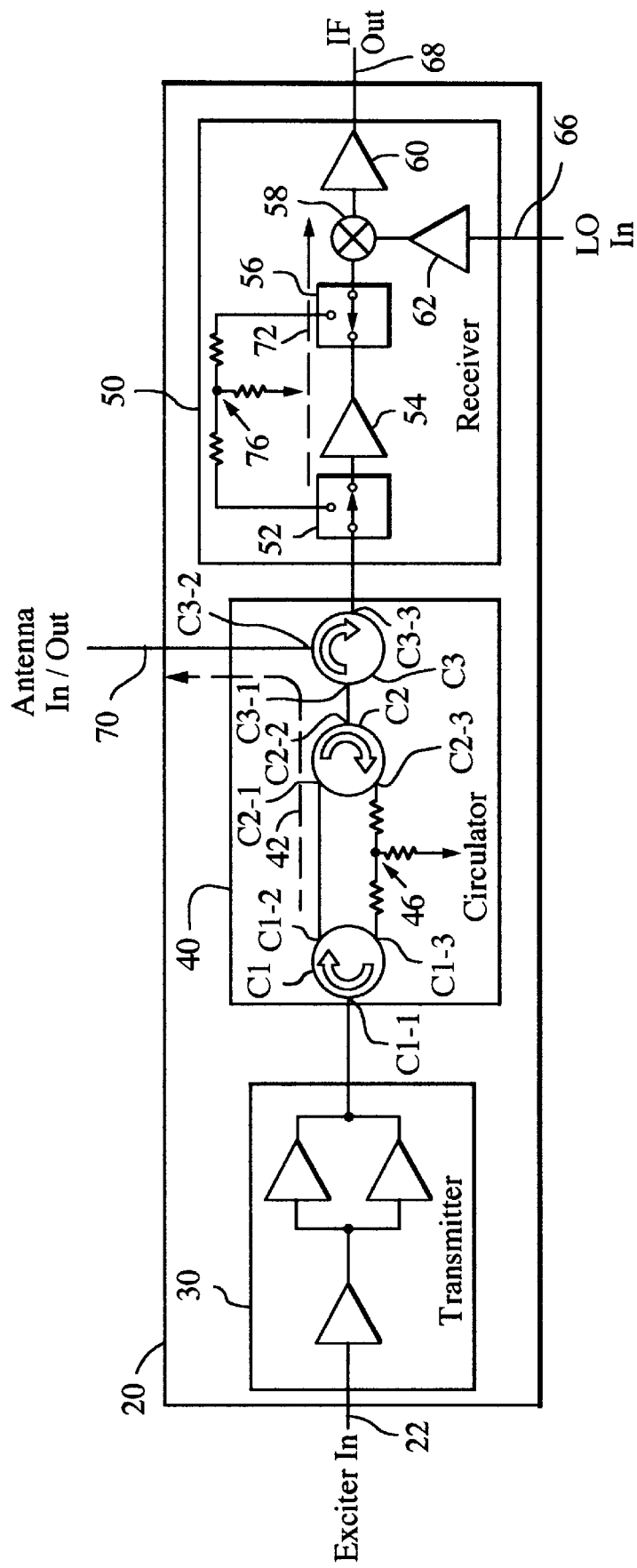
FIG. 1 is a simplified schematic diagram of an exemplary embodiment of a radar transmitter/receiver system embodying the invention, configured in a tactical mode.
Figure 2:
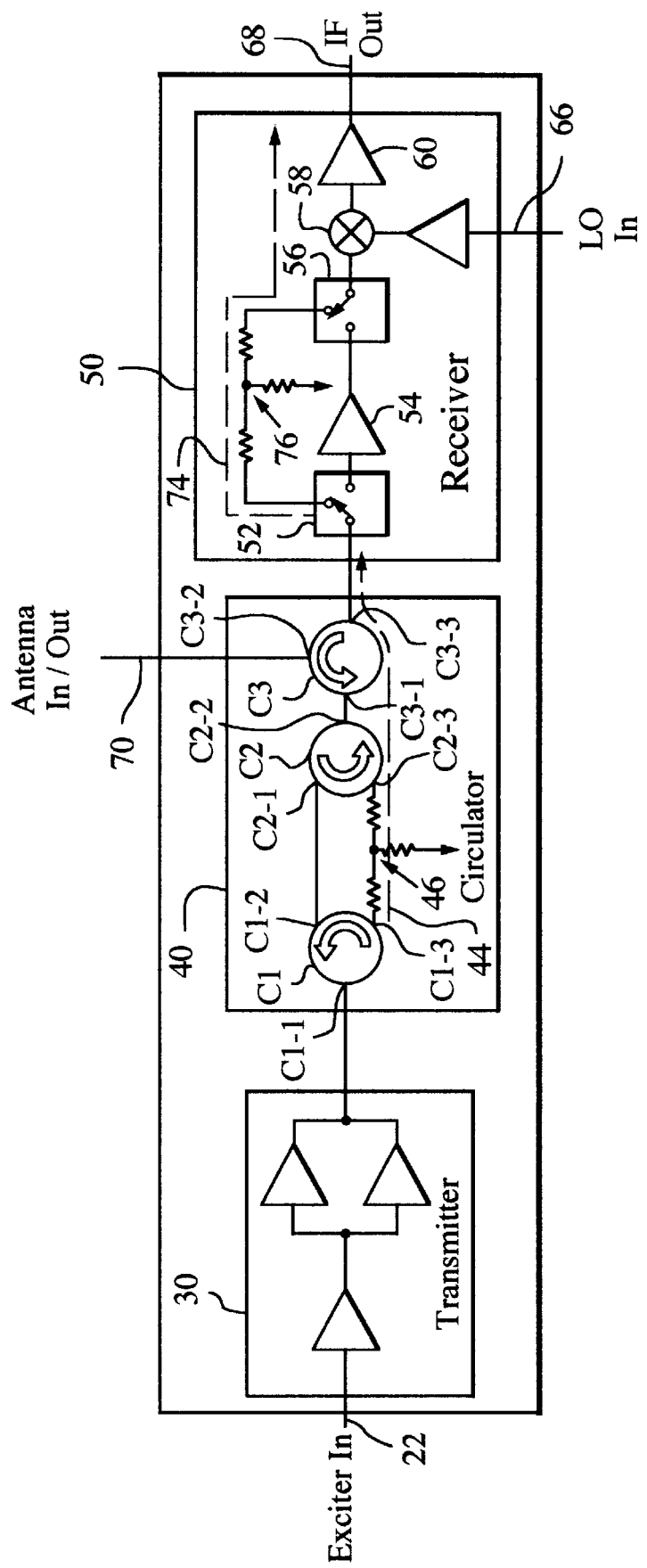
FIG. 2 is a simplified schematic diagram of the system of FIG. 1, but configured for a calibration mode.

An exemplary embodiment of a transmitter/receiver system 20 is depicted in the schematic diagrams of FIGS. 1 and 2 in respective tactical and calibration modes. The system 20 includes three principal subassemblies. The transmitter 30 provides high-power amplification of the RF pulsed waveform from the radar exciter. The circulator system 40 includes a combination of three switchable junctions C1, C2, and C3 and a high-power attenuator 46. This provides two signal paths for the transmitted signal. One path 42 passes through circulators C1, C2, and C3 to the antenna I/O port 70. The second path 44 passes through C1, the high power attenuator 46, C2 and C3. These paths 42, 44 are for all practical purposes identical in electrical length but one path (42) has nearly zero loss while the other (44) has an appreciable attenuation. The paths 42, 44 also provide nearly identical group delays between the calibration and tactical modes, and a highly stable group delay difference between these modes.

The system 20 further comprises receiver 50 which includes a receive tactical mode signal path 72 passing through a low noise amplifier (LNA) 54, mixer 58, and IF amplifier 60 for down-converting a radar signal using an LO signal at LO port 66. The receiver 50 also provides a receive calibration bypass signal path 74 of significant attenuation by use of single-pole, double-throw (SPDT) RF switches 52 and 56. The paths 72, 74 also provide nearly identical group delays between the calibration and tactical modes, and a highly stable group delay difference between these modes. Other ancillary functions typically contained in a transmitter/receiver system, including but not limited to transmit frequency upconverters, transmit gating switches and RF filters are not shown, but will typically be included in a system embodying the invention in accordance with requirements of particular applications.

During a system tactical mode (FIG. 1), the transmitter 30 operates at full power and amplifies the RF pulse from the exciter received at input port 22, and delivers it to the circulator system 40, to port C1-1 of circulator C1. The circulator system 40 is switched so that the low-loss path 42 between circulator junctions C1 and C2 is chosen, the signal passing from ports C1-1 to C1-2 of circulator junction C1 to port C2-1 of circulator junction C2, to port C3-1 of circulator junction C3 to port C3-2 of circulator junction C3. The signal path 42 is the transmit tactical mode signal path. The signal is output to the antenna I/O port 70 through circulator junction C3 with extremely low power losses. In the time between the transmit pulses, the signal is reflected from the target and reenters the antenna port 70, where circulator junction C3 delivers it to the receiver 50, the signal passing from port C3-2 to port C3-3 of circulator junction C3. Within the receiver, RF switches 52 and 56 steer the received signal through the high-gain/low-noise-amplifier path 72 and it is down-converted at mixer 58 and output at the IF Out port 68. The signal path 72 is a receive tactical mode signal path.

During a system calibration mode illustrated in FIG. 2, all of the circulator junctions are reversed compared to the tactical mode, and switches 52 and 56 are in the opposite state. Exactly as in the tactical mode, the transmitter 30 operates at full power, amplifies the RF pulse at port 22 from the exciter, and delivers it to the circulator system 40. Within the circulator system 40, junctions C1 and C2 steer the signal through the transmit calibration mode path 44 to the high-power attenuator 46, where it is significantly attenuated. Thus, the signal passes from port C1-1 to C1-3 of circulator junction C1, through attenuator 46 to port C2-3 to port C2-2 of circulator junction C2, to port C3-1 of circulator junction C3 to port C3-3 of circulator junction C3. Junction C3 thus bypasses the antenna port 70 and delivers the reduced (attenuated) transmit waveform directly to the receiver 50. Within the receiver, the switches 52 and 56 are set to bypass the signal around the LNA 54 through receive calibration mode signal path 74 and attenuator 76, which prevents receiver saturation and contributes to a much-reduced receiver gain so that an acceptable calibration mode IF output power is provided.

Switchable circulator junctions suitable for the purpose as junctions C1, C2 and C3 are commercially available. For example, EMS Technologies, Norcross, Ga, markets waveguide circulators with switchable junctions.

The exemplary embodiment of the invention provides an extremely accurate range calibration because of the following features:

1. The transmit high-power amplifier 30 is operated at full RF power during tactical and calibration modes, thereby preserving the transmit pulse rise/fall and pulse width characteristics.

2. The triple-junction switchable circulator system 40 provides a high-power attenuation bypass path 44 in calibration mode to accurately attenuate the transmit pulse with no compromise in frequency response, and it provides near identical group delay between the tactical and calibration signal paths 40, 42. The system 40 also routes the attenuated transmit (TX) signal directly to the receiver during calibration mode.

3. A bypass path 74 in the receiver is used to further reduce RX/TX path gain, and is designed to produce a negligible group delay difference between the tactical and calibration modes and an accurate IF output power level during calibration.

4. The amplitude and delay flatness of the bypass paths in both the triple-junction circulator and the receiver can be controlled, thereby preserving signal fidelity in the calibration mode. Path amplitude and delay flatness are controlled by specifying a flat frequency bandwidth over a sufficient bandwidth. Within the circulator and receive bypass paths, a flat frequency response over a wide bandwidth is easily attainable by those skilled in the art of producing RF attenuators. Further the tolerance of the group delay difference between tactical and calibration states is well controlled by employing tight dimensional tolerances during construction of the circulator and receiver.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A radar system having a tactical mode and a calibration mode, comprising:
   a transmitter section for providing high-power amplification of an RF pulsed waveform from an exciter during the tactical mode and the calibration mode;
   a circulator system having an input port connected to an output of the transmitter section and including first, second and third switchable junctions, and a high-power attenuator, the circulator system providing a transmit tactical mode signal path and a transmit calibration mode signal path of virtually identical electrical path lengths for a transmitter output signal, the transmit tactical mode path passing through the first, second and third junctions in a first direction to an antenna I/O port, the transmit calibration mode signal path passing through the first, second, and third junctions in a second direction and through the high-power attenuator to an output port; and a receiver section coupled to the output port including a receive tactical mode signal path through a low noise amplifier (LNA), mixer, and intermediate frequency (IF) amplifier to an IF output port for down-converting a radar signal, the receiver section further including a receive calibration mode signal path through a receiver attenuator which bypasses the LNA and passes through the mixer and IF amplifier to the IF output port.

2. The system of claim 1, wherein said high-power attenuator is connected between ports of said first and second circulator junctions in said transmit calibration mode signal path.

3. The system of claim 1, wherein a second port of said first circulator junction is connected to a first port of said second circulator junction by a first transmission line segment forming a portion of said transmit tactical mode signal path, and a third port of said first circulator junction is connected to a third port of said second circulator junction through said high-power attenuator and a second transmission line segment.

4. The system of claim 1, wherein the transmit tactical mode signal path and the transmit calibration signal path provide nearly identical group delays between the calibration and tactical modes.

5. The system of claim 1, wherein the receiver section includes a first RF switch and a second RF switch for selectively bypassing the receive tactical mode signal path and selecting the receive calibration mode signal path during the calibration mode, said receive calibration mode signal path providing a nearly identical group delay to a group delay of the receive tactical mode signal path.

6. The system of claim 5, wherein said receiver attenuator is connected in said receive calibration mode signal path between said first RF switch and said second RF switch.

7. The system of claim 6 wherein said first RF switch is disposed in an input signal path leading to an input of the LNA, and the second RF switch is disposed in an output signal path leading from an output of the LNA to an input to said mixer.

8. The system of claim 5, wherein said first RF switch is a first single-pole-double-throw (SPDT) switch, and said second RF switch is a second SPDT switch.

9. A transmit/receive system having a range calibration mode and a tactical mode, comprising:

a non-linear high-power transmitter section for providing high power amplification of an RF pulsed waveform, the transmitter section operated at full RF power during the tactical mode and the range calibration mode, thereby preserving transmit pulse rise/fall time and pulse width characteristics;

a triple-junction switchable circulator system connected to an output of the transmitter section and providing a high-power attenuation bypass signal path in the range calibration mode to accurately attenuate the transmit pulse with no compromise in frequency response between the tactical mode and the calibration mode, and providing near identical group delay through the system in the calibration and tactical modes, the circulator system routing the transmit pulse to the receiver during the calibration mode;

a receiver section including a low noise amplifier (LNA), mixer, and intermediate frequency (IF) amplifier, and including a receive bypass signal path in the range calibration mode to further reduce RX/TX path gain, the receive bypass signal path adapted to produce a negligible group delay difference between the tactical and calibration modes and an accurate IF output power level during calibration.

10. The system of claim 9, wherein the circulator system includes first, second, and third circulator junctions, connected together to provide a transmit tactical path passing through the first, second and third junctions in a first direction to an antenna I/O port, the high-power attenuation bypass signal path passing through the first, second, and third junctions in a second direction and through the high-power attenuator.

11. The system of claim 10, wherein a second port of said first circulator junction is connected to a first port of said second circulator junction by a first transmission line segment forming a portion of said transmit tactical mode signal path, and a third port of said first circulator junction is connected to a third port of said second circulator junction through said high-power attenuator and a second transmission line segment.

12. The system of claim 9, wherein the receiver section includes a first RF switch and a second RF switch for selectively bypassing the LNA during the calibration mode.

13. The system of claim 12, wherein said receiver attenuator is connected in said receive bypass signal path between said first RF switch and said second RF switch.

14. The system of claim 13, wherein said first RF switch is disposed in an input signal path leading to an input of the LNA, and the second RF switch is disposed in an output signal path leading from an output of the LNA to an input to said mixer.

15. The system of claim 9, wherein said first RF switch is a first single-pole-double-throw (SPDT) switch, and said second RF switch is a second SPDT switch.

* * * * *

UNITED STATES PATENT AND TRADEMARK OFFICE
CERTIFICATE OF CORRECTION

PATENT NO. : 6,707,417 B2
DATED : March 16, 2004
INVENTOR(S) : Steve Edward Huettner, Steven Craig Rein and Douglas Richard Baker It is certified that error appears in the above-identified patent and that said Letters Patent is hereby corrected as shown below:

<u>Column 1,</u>
Line 2, delete "N0000-24-97-C-5390" and insert -- N00024-00-C-5390 --.

Signed and Sealed this

Twenty-first Day of September, 2004

JON W. DUDAS
*Director of the United States Patent and Trademark Office*